Sept. 21, 1965  R. N. LEVAKE  3,207,383
FLUID POWERED, AIR ELIMINATING DISPENSER OF LIQUIDS
Filed Jan. 30, 1963  2 Sheets-Sheet 1

RICHARD N. LEVAKE
INVENTOR
Huebner & Worrel
ATTORNEYS

Sept. 21, 1965　　　　　R. N. LEVAKE　　　　　3,207,383
FLUID POWERED, AIR ELIMINATING DISPENSER OF LIQUIDS
Filed Jan. 30, 1963　　　　　　　　　　　　　2 Sheets-Sheet 2

RICHARD N. LEVAKE
INVENTOR

*Huebner & Worrel*
ATTORNEYS

United States Patent Office 3,207,383
Patented Sept. 21, 1965

3,207,383
FLUID POWERED, AIR ELIMINATING DISPENSER OF LIQUIDS
Richard N. Levake, Phoenix, Ariz., assignor to Plastic Materials, Inc., a corporation of California
Filed Jan. 30, 1963, Ser. No. 254,980
9 Claims. (Cl. 222—318)

The present invention relates to a liquid dispensing apparatus having a reciprocable pump piston and which is especially adapted for use in an environment accommodating a minimum axial stroke of the piston. The invention particularly relates to such apparatus adapted to dispense viscous liquids in which a quantity of air has been previously entrained, the apparatus being capable of preventing air pockets from forming in the portion so dispensed.

During the mixing and preparation of certain viscous liquids, such as oil-base and latex emulsion-type paints, and various synthetic resins, such as polyester resins and the like, a certain quantity of air is unavoidably entrained in the liquid. During the subsequent dispensing of such liquids following their mixing, such entrained air frequently collects in large bubbles which preclude accurate dispensing and accurate proportioning of the liquid if it is to be mixed with another material. This problem exists almost universally when piston-type pump dispensers are utilized wherein the dispenser is filled by suction during movement of the pump piston in one direction and discharged by movement of the piston in an opposite direction.

In addition to the problem of bubbles being formed from the air entrained in such viscous liquids, previously known reciprocable piston dispensing pumps must necessarily be extended a predetermined axial distance for proper operation and such distance cannot be accommodated in many environments.

Accordingly, it is an object of the present invention to provide liquid dispensing apparatus having a pump piston and requiring a minimum axial clearance for operation.

Another object of the present invention is to provide dispensing apparatus particularly adapted to pump heavy, viscous liquids.

Another object is to provide piston-type dispensing apparatus capable of pumping viscous liquids in which air has been previously entrained while precluding or minimizing the formation of air bubbles in the liquid.

A further object is to provide dispensing apparatus for heavy viscous liquids wherein a relatively large diameter pump piston is employed and pressure fluid actuated power means is associated with the piston in such a manner to insure precise reciprocation of the piston.

These, together with other objects, will become more fully apparent upon reference to the following description and accompanying drawings.

Figure 1:
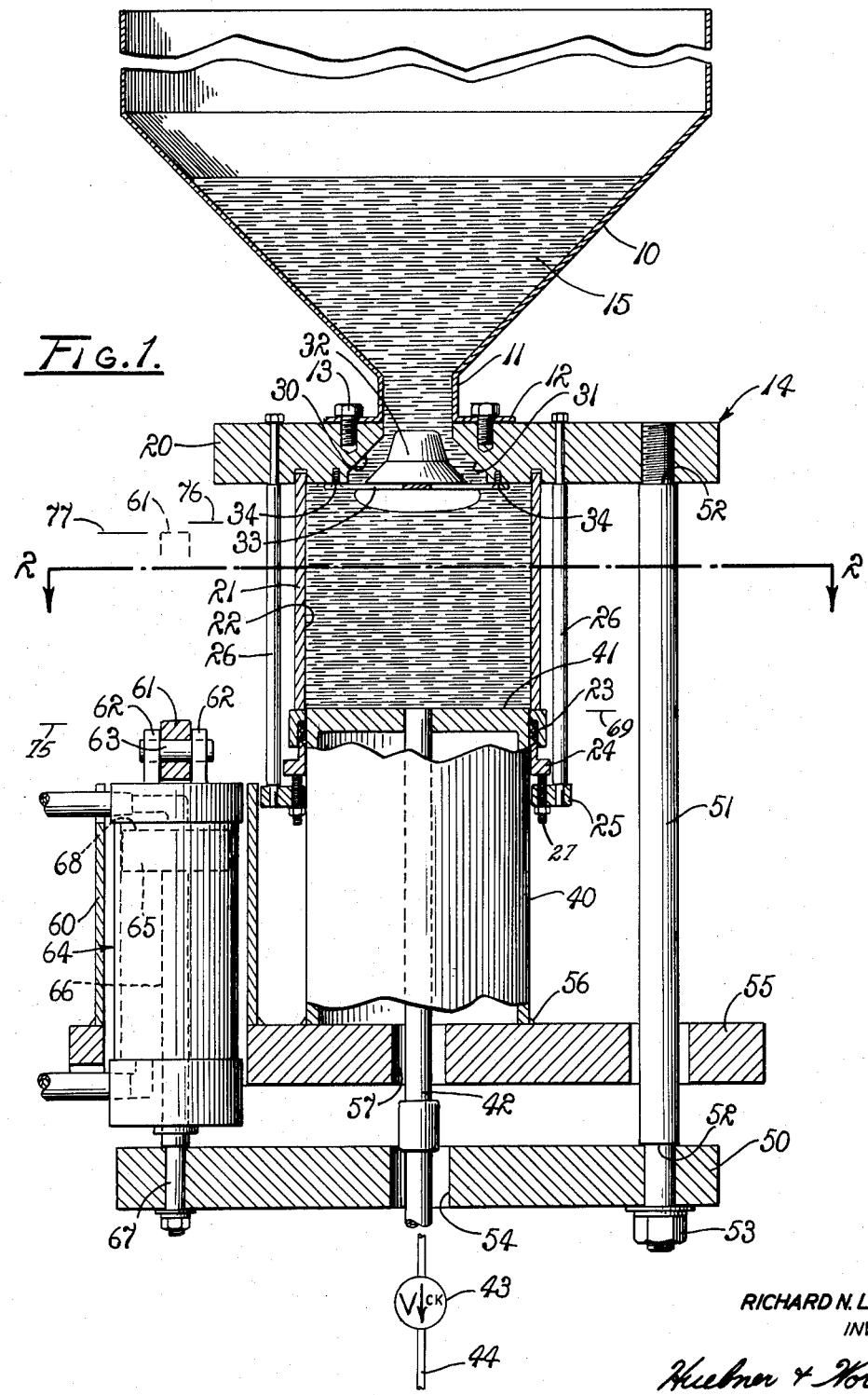
FIG. 1 is a central, vertical section of the dispensing apparatus embodying the principles of the present invention with certain portions thereof being shown in front elevation.

Referring more particularly to FIG. 1, a reservoir is illustrated at 10 and is provided with a tubular neck 11 which serves as a conduit. The reservoir terminates in an annular flange 12 secured by means of a plurality of cap screws 13 to a pump housing 14. The reservoir is adapted to be filled gravitationally and serves as a source of supply for a liquid substance, indicated at 15, having small amounts of air entrained therein, such amounts normally not being discernible unless optically magnified. In a commercial embodiment of the invention, the liquid consists of a polyester resin in which particles of silica have been mixed. During the mixing process, a certain quantity of air is unavoidably entrained in the resin, the air being in the form of myriads of tiny air bubbles substantially invisible to the human eye.

The pump housing 14 comprises an upper reaction plate 20 to which is secured a tubular cylinder 21 provided with a cylindrical bore 22. An annular seal 23 is carried by the cylinder and is adapted to be selectively compressed by a packing gland 24. An annular compression ring 25 connected to the upper reaction plate 20 by a plurality of rods 26 serves as a base for a plurality of circumferentially spaced adjustment screws 27. By appropriate movement of the screws 27, selective compression of the annular seal 23 is effected.

An outwardly flaring discharge opening 30 is provided in the plate 20 in communication with the tubular neck 11 of the reservoir 10. The opening 30 constitutes a continuation of the conduit between the reservoir and the housing formed by the neck 11. An annular valve seat 31 circumscribes such conduit and is provided on the plate 20. A valve check 32 is gravitationally biased to an open position, as shown in FIG. 1, and is adapted to be urged into substantially sealing engagement with the seat 31 under the influence of an upwardly directed force, as viewed in FIG. 1. The valve check 32 is limited in its range of movement away from the valve seat by means of a pair of diametrically extended cross arms 33 secured to the plate 20 by cap screws 34.

Slidably received within the cylindrical bore 22 of the tubular cylinder 21 is a pump piston 40. The volume of the reservoir 10 is larger than the effective displacement of the piston 40 during its downward stroke. The piston is provided with a pressure face 41 having a central aperture therein in communication with a conduit 42 rigidly secured to the piston, as by welding. The conduit 42 is extended along the axis of the cylinder 21, and in the embodiment illustrated, is in the form of a rigid pipe. The conduit includes a flexible portion, not indicated, and is provided with a check valve 43 preferably disposed immediately adjacent to a discharge nozzle 44.

A base plate 50 is provided as a main frame member and supports the pump housing 14 by means of a plurality of elongated connecting rods 51 circumferentially spaced about the housing 14. Each of the rods 51 is provided with upper and lower shoulders 52 adapted to engage the upper reaction plate 20 and the base plate 50. These plates are maintained in an assembled condition by means of respective nuts 53 screw-threadably connected to the rods 51. The base plate is also provided with a central aperture 54 through which the conduit 42 extends.

Intermediate the upper reaction plate 20 and the base plate 50 is disposed a power transmitting and synchronizing plate 55 rigidly secured to the lower portion of the piston 40 as by being welded thereto at 56. The plate 55 is also provided with a central aperture 57 to permit the passage therethrough of the conduit 42.

A plurality of tubular struts 60 are individually rigidly connected to the plate 55, as by welding, and are disposed at uniform radial and circumferential intervals of spacing about the longitudinal axis of the cylindrical bore 22. Each of the struts 60 is provided with a transverse beam 61 connected to a pair of opposed lugs 62 by a connecting pin 63. Each pair of lugs 62 is rigidly secured to a respective pressure fluid actuated ram 64 received within a respective one of the tubular struts 60. Each of the pressure fluid rams 64 includes a stationary piston 65 having an axially extended piston rod 66 rigidly connected to the base plate 50 by means of an anchor bolt 67. Also, each of the pistons 65 is provided with a pressure face 68 which is fully exposed to the actuating pressure fluid during extension of the respective ram 64.

Figure 2:
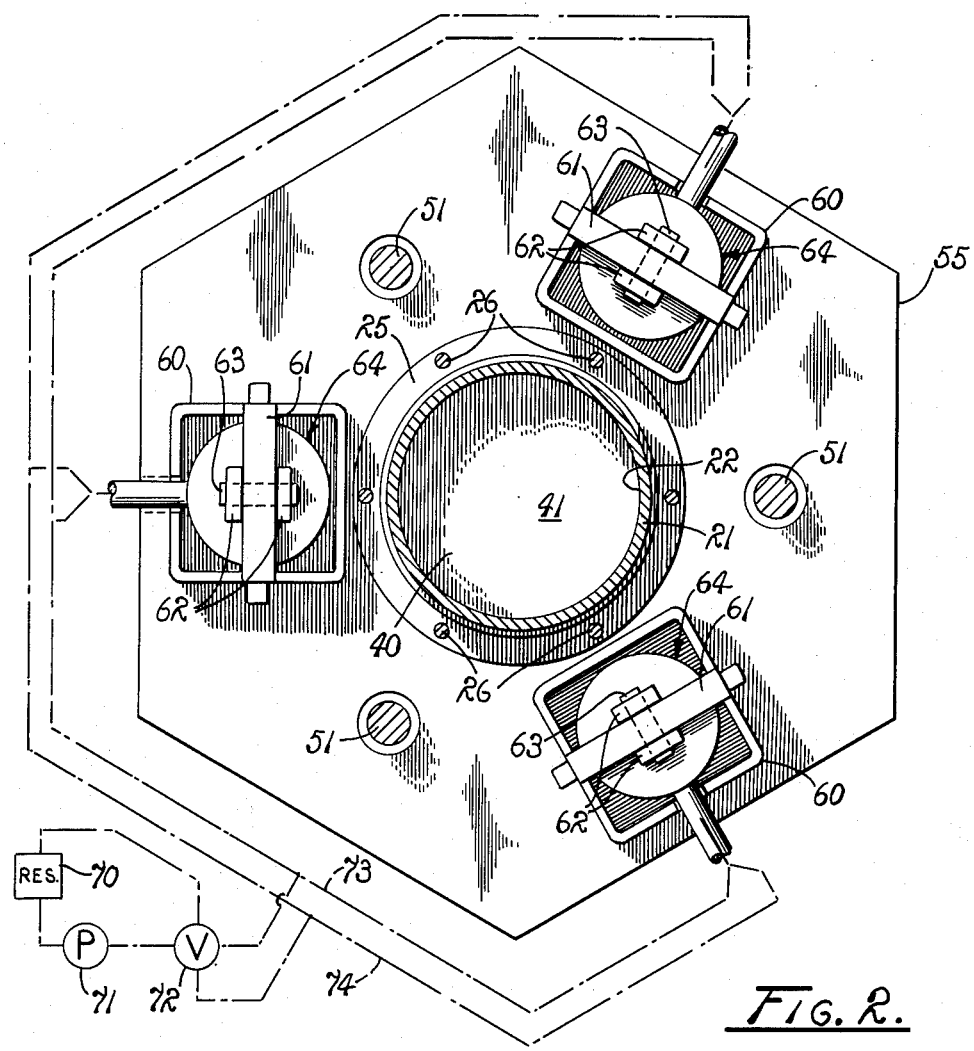
FIG. 2 is a view in horizontal, transverse section taken in a plane represented by the line 2—2 in FIG. 1, portions of the apparatus being shown schematically.
Figure 3:
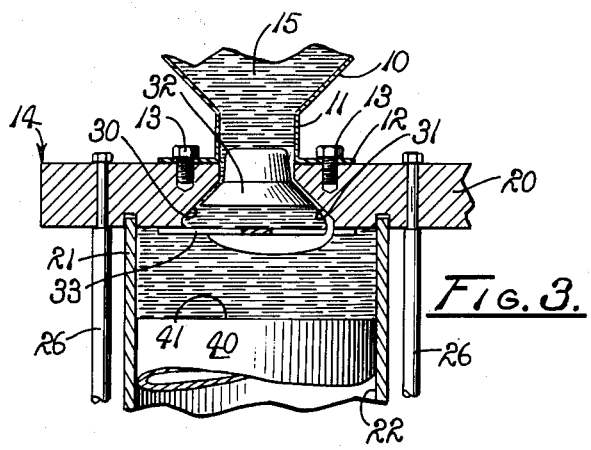
FIG. 3 is a fragmentary view of the apparatus of FIG. 1 showing the check valve in a position during piston movement to effect pumping discharge of liquid from the apparatus.

In FIG. 2, a pressure fluid reservoir is diagrammatically indicated at 70 and a fluid flow control means is illustrated as comprising a pump 71 in communication with the reservoir, a valve 72 and a pair of conduits 73 and 74 connected to the valve and alternately serving as supply and return lines during selective actuation of the rams 64.

By referring to FIG. 1, it can be seen that the piston 40 is adapted for reciprocal movement within a predetermined range, the lower limit of which is indicated at 65 and the upper limit of which is indicated at 76. In like manner, each of the actuating rams 64 is adapted for reciprocable movement through a predetermined range; the lower limit of which is indicated at 75 as being the upper surface of the synchronizing plate 55 and the upper limit of such range being indicated at 77. It can thus be seen that the range of operating movement of the ram 64 is within the range of movement of the piston 40.

*Operation*

The operation of the described embodiment of the subject invention is believed to be readily apparent and is briefly summarized at this point. Assuming that the reservoir 10 has been filled with a viscous liquid 15 containing entrained air, and that the pressure fluid pump 71 is operating to provide a supply of pressure fluid to the valve 72, this valve is moved to an appropriate position to effect admission of pressure fluid through conduit 74 and return of fluid to the reservoir 70 through conduit 73. Such flow of pressure fluid effects retraction of the rams 64 and consequent, synchronized downward movement of the pump piston 40 by means of the interconnecting plate 55. Consequently, a partial vacuum results in the upper portion of the cylindrical bore, due to the fact that check valve 43 is closed and that the extreme viscosity of the fluid 15 precludes flow through the conduit 11 and opening 30 at a sufficient rate to fill the bore 22 at the same rate of movement of the piston 40. This partial vacuum causes tiny portions of entrained air to collect in a relatively large bubble immediately beneath the check valve 32. If not removed from the pump bore, this bubble remains in the bore and grows in size upon successive downward movements of the piston 40. Ultimately, the bubble becomes of such magnitude that portions of it are discharged through the conduit 42 upon upward, dispensing movement of the piston 40.

Accordingly, the bubble resulting from the partial vacuum applied to the viscous liquid and air entrained therein must be allowed to escape through the check valve upon initial upward pumping movement of the piston 40. By providing a gravitationally biased valve check 22, which is adapted to engage the valve seat 31 substantially to seal the conduit against upward passage of the liquid but permitting the escape of air which is of a greater fluid penetrability than the liquid 15, the air bubble is dissipated upon initial upward movement of the piston 40. The relative position of the valve check 22 in such a condition is illustrated in FIG. 2 and the escape of the air bubble is shown schematically. Accordingly, a given linear distance of movement in an upward direction, as viewed in FIG. 1, during any dispensing stroke of the piston 40 results in a uniform metered portion of the liquid 15 being discharged through the nozzle 44 and precludes the formation of any air bubble or pocket in such a discharged portion.

It will readily be appreciated that a pump-type dispensing apparatus has been provided by the present invention which is capable of accurately dispensing a viscous liquid having air entrained therein and is capable of preventing air bubbles from being formed in the portions of the liquid dispensed by the apparatus. It will also be observed that the invention provides pressure fluid actuated rams disposed uniformly about the pump piston 40 in such a manner that the piston is prevented from cocking in the bore and the pressure face 41 is at all times disposed in a plane substantially normal to the longitudinal axis of the bore 22. This arrangement also permits the apparatus to be installed in an environment affording a minimum axial dimension while permitting a full range of movement of the pump piston 40 during reciprocation. By referring to FIG. 1, it can be seen that the range of movement of the rams 64 and associated power transmitting elements is within the range of movement of the pump piston 40.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patents is:

1. Dispensing apparatus comprising a pump housing provided with an upright cylindrical bore; a piston slidably received in the bore for reciprocable movement in substantially sealing engagement with the housing; a source of supply for a liquid substance having air entrained therein; means providing for downward flow of said liquid substance from said supply source into the upper end of said bore upon downward movement of the piston, including means to permit the return to said supply source of air separated from said substance; the volume of the source of supply being larger than the effective displacement of the piston. A hollow rod secured to said piston providing for downward flow of said liquid substance from said bore upon upward movement of the piston and force means operably associated with said piston to effect selective reciprocation thereof in said housing.

2. Dispensing apparatus comprising a pump housing provided with an upright cylindrical bore; a piston slidably received in the bore in substantially sealing engagement with the housing and arranged for reciprocable movement between predetermined limits along an axial path of travel; a source of supply for a liquid substance; means providing for downward flow of said liquid substance from said supply source into the upper end of said bore upon downward movement of the piston; a hollow rod secured to said piston providing for downward flow of said liquid substance from said bore upon upward movement of the piston; the volume of the source of supply being larger than the effective displacement of the piston; and force means operably connected between the piston and the housing to effect selective reciprocable movement of the piston between said limits, said force means being radially spaced from said axial path of travel and arranged for movement within said predetermined limits.

3. Dispensing apparatus comprising a pump housing provided with an upright cylindrical bore; a piston slidably received in the bore in substantially sealing engagement with the housing and arranged for reciprocable movement between predetermined limits along an axial path of travel; a supply reservoir for a liquid substance having air entrained therein; the volume of the supply reservoir being larger than the effective displacement of the piston; conduit means providing a flow of said liquid substance from said reservoir into the upper end of said bore upon downward movement of the piston; a check valve provided in said conduit means preventing return flow of said liquid to said reservoir upon upward movement of the piston while permitting return of the reservoir of any air separated from said substance upon upward movement of the piston; a hollow rod fixed to the piston providing for downward flow of said liquid substance from said bore upon upward movement of the piston; a plurality of individual force means arranged about said housing at uniform radial and circumferential intervals of spacing; and power transmission means operably connecting said force means and said piston to effect selective reciprocable movement of the piston between said limits.

4. Dispensing apparatus comprising a pump housing provided with an upright cylindrical bore; a piston slidably received in the bore in substantially sealing engagement with the housing and arranged for reciprocable movement between predetermined limits along an axial path of travel; a supply reservoir for a liquid substance having air entrained therein; the volume of the supply reservoir being larger than the effective displacement of the piston; conduit means providing a flow of said liquid substance from said reservoir into the upper end of said bore upon downward movement of the piston; a valve seat provided in said conduit means; a gravitationally biased valve check supported in the conduit and adapted to move upward to engage said valve seat to permit downward flow of said liquid substance through the conduit while permitting air separated from the liquid substance to be returned to the reservoir; means limiting the range of movement of said valve check away from said seat; a hollow rod secured to said piston for providing a downward flow of said liquid substance from said bore upon upward movement of the piston; a plurality of individual force means arranged about said housing at uniform radial and circumferential intervals of spacing; and power transmission means operably connecting said force means and said piston to effect selective reciprocable movement of the piston between said limits.

5. The dispensing apparatus of claim 4 wherein said force means comprises three separate pressure fluid actuated rams arranged in substantially equally radially spaced relation about said axial path of travel at uniform circumferential intervals of spacing thereabout and operably associated with a source of pressure fluid and controls therefor to effect selective reciprocable movement of the piston.

6. Dispensing apparatus comprising a pump housing provided with an upright cylindrical bore; a piston slidably received in the bore in substantially sealing engagement with the housing and arranged for reciprocable movement between predetermined limits along an axial path of travel; a supply reservoir for a liquid substance having air entrained therein; the volume of the supply reservoir being larger than the effective displacement of the piston; conduit means providing a flow of said liquid substance from said reservoir into the upper end of said bore upon downward movement of the piston; a valve seat provided in said conduit means; a gravitationally biased valve check supported in the conduit and adapted to move upward to engage said valve seat to permit downward flow of said liquid substance through the conduit while permitting air separated from the liquid substance to be returned to the reservoir; means limiting the range of movement of said valve check away from said seat; a hollow rod secured to said piston for providing a downward flow of said liquid substance from said bore upon upward movement of the piston; force means operably connected between the piston and the housing to effect selective reciprocable movement of the piston between said limits, said force means being radially spaced from said axial path of travel and arranged for movement within said predetermined limits; and power transmission means operably connecting said force means and said piston to effect selective reciprocable movement of the piston between said limits.

7. Dispensing apparatus comprising a pump housing provided with a cylindrical bore generated about a substantially vertical axis, a piston slidably received in the bore in substantially sealing engagement with the housing and arranged for reciprocable movement between predetermined limits along an axial path of travel, the piston having a pressure face disposed in a plane substantially normal to said path; a supply reservoir disposed above said housing and having a discharge opening therein in communication with the upper end of the bore and permitting gravitational flow of a liquid substance; the volume of the supply reservoir being larger than the effective displacement of the piston; a valve seat provided in the housing adjacent to said opening; a normally open gravitationally biased valve check adapted to engage said seat and close said opening under the influence of an upwardly directed force acting on the check; valve means limiting downward movement of said check valve away from said seat; a vertical conduit carried by said piston and in communication with said bore through said piston face; check valve means provided in said conduit; a plurality of pressure fluid actuated extensible means arranged about said axis at substantially uniform radial and circumferential intervals of spacing respectively and arranged for operation along respective paths of travel parallel to said axis; means interconnecting said rams and said piston; and a source of pressure fluid including control means to effect synchronized extension and retraction of said rams.

8. Dispensing apparatus comprising in combination: a reservoir for a liquid substance having air entrained therein, a member positioned below said reservoir and having an upright cylindrical bore, a piston slidably received in the bore for axial reciprocating movement, the volume of the reservoir being larger than the effective displacement of the piston, means forming a restricted passage connecting the lower portion of the reservoir with the upper end of said bore, said passage including a valve seat, a gravitationally biased check valve movable upward into closed position against said seat, means limiting downward movement of said check valve away from said seat, means for moving the piston axially in both directions, downward movement of the piston in said bore acting to cause flow of liquid substance from said reservoir into the upper end of said bore, whereby bubbles of entrained air accumulate adjacent said check valve, means including a hollow rod secured to said piston and extending axially therethrough providing a conduit for discharge of liquid substance from said bore upon upward movement of the piston, said upward movement of the piston serving initially to cause upward flow of air past said check valve toward said reservoir and continued upward movement of the piston acting to close said check valve and effect discharge of liquid substance from said bore through the latter said conduit.

9. Dispensing apparatus comprising in combination: a reservoir for a liquid substance having air entrained therein, a member positioned below said reservoir and having an upright cylindrical bore, a piston slidably received in the bore for axial reciprocating movement, the volume of the reservoir being larger than the effective displacement of the piston, means forming a restricted passage connecting the lower portion of the reservoir with the upper end of said bore, said passage including a valve seat, a gravitationally biased check valve moveable upward into closed position against said seat, means limiting downward movement of said check valve away from said seat, means including hydraulic means for moving the piston axially in both directions, downward movement of the piston in said bore acting to cause flow of liquid substance from said reservoir into the upper end of said bore, whereby bubbles of entrained air accumulate adjacent said check valve, means including a hollow rod secured to said piston and extending axially therethrough providing a conduit for discharge of liquid substance from said bore upon upward movement of the piston, said upward movement of the piston serving initially to cause upward flow of air past said check valve toward said reservoir and continued upward movement of the piston acting to close said check valve and effect discharge of liquid substance from said bore through the latter said conduit.

References Cited by the Examiner

UNITED STATES PATENTS

| | | | |
|---|---|---|---|
| 764,731 | 7/04 | Lambert | 141—116 |
| 2,156,527 | 5/39 | Clark | 222—383 X |
| 2,232,449 | 2/41 | Habenicht. | |
| 3,023,936 | 3/62 | Marsh et al. | 222—318 X |

LOUIS J. DEMBO, *Primary Examiner.*